US011254083B2

(12) United States Patent
Caviezel

(10) Patent No.: US 11,254,083 B2
(45) Date of Patent: Feb. 22, 2022

(54) FLUID TRANSPORT PIPE AND USE THEREOF

(71) Applicant: EMS-PATENT AG, Domat/Ems (CH)

(72) Inventor: Heinz Caviezel, Masein (CH)

(73) Assignee: EMS-Patent AG, Domat/Ems (CH)

( * ) Notice: Subject to any disclaimer, the term of this patent is extended or adjusted under 35 U.S.C. 154(b) by 71 days.

(21) Appl. No.: 16/717,369

(22) Filed: Dec. 17, 2019

(65) Prior Publication Data

US 2020/0198203 A1  Jun. 25, 2020

(30) Foreign Application Priority Data

Dec. 20, 2018 (EP) ..................................... 18214857

(51) Int. Cl.
| | | |
|---|---|---|
| *B32B 1/08* | (2006.01) | |
| *B32B 27/34* | (2006.01) | |
| *B29C 48/00* | (2019.01) | |
| *B29C 48/09* | (2019.01) | |
| *F16L 9/133* | (2006.01) | |
| *B29C 49/06* | (2006.01) | |
| *B29C 45/00* | (2006.01) | |
| *B29C 49/00* | (2006.01) | |
| *B29K 23/00* | (2006.01) | |
| *B29K 77/00* | (2006.01) | |
| *B29K 96/04* | (2006.01) | |
| *B29L 9/00* | (2006.01) | |
| *B29L 23/00* | (2006.01) | |

(52) U.S. Cl.
CPC ............ *B32B 1/08* (2013.01); *B29C 45/0001* (2013.01); *B29C 48/022* (2019.02); *B29C 48/09* (2019.02); *B29C 49/0005* (2013.01); *B29C 49/06* (2013.01); *B32B 27/34* (2013.01); *F16L 9/133* (2013.01); *B29K 2023/16* (2013.01); *B29K 2065/00* (2013.01); *B29K 2077/00* (2013.01); *B29K 2096/04* (2013.01); *B29L 2009/00* (2013.01); *B29L 2023/22* (2013.01); *Y10T 428/1393* (2015.01); *Y10T 428/31728* (2015.04); *Y10T 428/31732* (2015.04)

(58) Field of Classification Search
CPC ........... B32B 1/08; B32B 27/08; B32B 27/18; B32B 27/34; B32B 2307/30; B32B 2307/714; B32B 2307/732; B32B 2307/3065; B32B 2597/00; B29C 48/022; B29C 48/09; B29C 49/06; B29C 45/0001; B29C 49/0005; Y10T 428/31728; Y10T 428/31732; Y10T 428/1393; B29K 2023/16; B29K 2065/00; B29K 2077/00; B29K 2096/04; B29L 2009/00; B29L 2023/22; F16L 9/12; F16L 9/133

See application file for complete search history.

(56) References Cited

U.S. PATENT DOCUMENTS

| | | | | |
|---|---|---|---|---|
| 5,389,410 | A * | 2/1995 | Mugge ................... | B32B 27/08 428/34.1 |
| 6,254,949 | B1 * | 7/2001 | Gluck ..................... | C08L 77/00 138/118 |
| 2003/0008090 | A1 | 1/2003 | Rohde et al. | |
| 2011/0220236 | A1 * | 9/2011 | Kettl ....................... | C08L 77/06 138/137 |
| 2012/0040115 | A1 | 2/2012 | Blondel et al. | |
| 2012/0237708 | A1 | 9/2012 | Caviezel et al. | |

FOREIGN PATENT DOCUMENTS

| | | |
|---|---|---|
| EP | 2 366 539 A1 | 9/2011 |
| EP | 1 265 749 B1 | 11/2012 |
| EP | 3 385 074 A1 | 10/2018 |
| JP | H01-269536 A | 10/1989 |

OTHER PUBLICATIONS

European Patent Office, Extended European Search Report in European Patent Application No. 18214857.7 (dated Jun. 14, 2019).
U.S. Appl. No. 13/421,541, filed Mar. 15, 2012.

* cited by examiner

*Primary Examiner* — Walter Aughenbaugh
(74) *Attorney, Agent, or Firm* — Leydig, Voit & Mayer, Ltd.

(57) ABSTRACT

Disclosed is a fluid transport pipe which has an inner layer, coming in contact with a fluid, comprising at least one aliphatic polyamide and at least one impact modifier and also at least one outer layer which is connected directly to the inner layer and is formed from an aliphatic polyamide and at least one flame retardant. While the inner layer ensures the chemical resistance relative to the fluids to be transported and the mechanical resistance, the flame resistance is ensured by the outer layer.

17 Claims, No Drawings

FLUID TRANSPORT PIPE AND USE THEREOF

CROSS-REFERENCE TO A RELATED APPLICATION

This patent application claims the benefit of European Patent Application No. 18 214 857.7, filed on Dec. 20, 2018, the disclosure of which is incorporated herein by reference in its entirety for all purposes.

The invention relates to a fluid transport pipe which has an inner layer, coming in contact with a fluid, comprising at least one aliphatic polyamide and at least one impact modifier and also at least one outer layer which is connected directly to the inner layer and is formed from an aliphatic polyamide and at least one flame retardant. Whilst the inner layer ensures the chemical resistance relative to the fluids to be transported and the mechanical resistance, the flame resistance is ensured by the outer layer.

Transport of liquids, in particular in the automotive field, requires the use of specific materials. According to the material and specification, such transport pipes must pass a series of tests. In particular in the transport of coolants, the specifications to be fulfilled are strict. The supply of aqueous solutions, generally water-glycol mixture, demands hydrolysis resistance of the components which come in contact with the aqueous solutions.

Particularly high specifications are also concerned in the electric automobile field. Thus the electrochemical reactions of a lithium-ion battery are only possible within a defined temperature range. Such accumulators in an electric car generally operate in a temperature range of 20 to 30° C. Insofar as a temperature of 30° C. is exceeded, ageing of such a battery increases exponentially. At temperatures from 40° C., lasting damage to the battery can also occur. In addition, overheating of the battery can lead to the risk of fire which can lead to undesired damage in the vehicle.

Generally, such pipes consist of flame-retardant materials or have at least layers with a flame retardant. Such a multilayer pipe is known from EP 1 265 749, a flame-retardant layer based on polyolefins being used.

A flexible pipe based on polyamide is known from JP 1269536. This pipe has a two-layer construction, the outer layer being formed from PA11 or PA12 and the inner layer from a flame-retardant elastomeric copolyamide.

In the case of such a multilayer construction, generally adhesive layers are used in order to enable the bond between the flame-retardant material and the core material. However this then necessarily leads to fairly complex manufacturing of these components and to a higher weight of the components. The weight reduction of such components, in particular in applications in the automobile industry, is a particularly important aspect in manufacture.

Starting herefrom, it was the object of the present invention to provide fluid transport pipes which overcome the disadvantages known from the state of the art and have good chemical resistance relative to the fluid to be transported, with simultaneously good mechanical and flame-retardant properties and a low weight of the fluid pipes. In addition, the complexity in the production of these pipes should be kept as low as possible.

This object is achieved by the features of the fluid transport pipe described herein, and the advantageous embodiments thereof. Uses according to the invention are also described.

According to the invention, a fluid transport pipe is provided, which comprises the following layers:

an inner layer, coming in contact with a fluid, formed from a moulding compound comprising at least one aliphatic polyamide and at least one impact modifier, the at least one polyamide having an amine end group concentration of 30 to 90 mmol/kg, and at least one outer layer, connected directly to the inner layer, formed from a moulding compound comprising at least one aliphatic polyamide, having at least one flame-retardant.

In the sense of the present invention, there is understood by the term "polyamide" (abbreviation PA), a generic term which includes homopolyamides and copolyamides. The chosen spellings and abbreviations for polyamides and the monomers thereof correspond to those specified in the ISO standard 16396-1 (2015, (D)). The abbreviations used therein are used synonymously subsequently to the IUPAC names of the monomers.

It is preferred that the polyamides of the inner and outer layer are selected from the group consisting of PA12, PA612, PA1010, PA106, PA1016, PA1012, PA614, PA615, PA616, PA618, PA1212, PA610, PA11 and the copolyamides, mixtures and blends thereof, preferably PA12, PA11, PA610, PA612 and PA11, particularly preferably PA12, the inner and outer layer comprising preferably polyamides of the same type.

Preferably, the polyamides have an amino end group concentration of 30 to 80 mmol/kg, preferably of 35 to 75 mmol/kg and particularly preferably of 40-60 mmol/kg. Determination of the end group concentration is thereby effected potentiometrically. Preferably, the amino end group concentration is greater than the carboxyl end group concentration.

A preferred embodiment provides that the at least one flame retardant is a halogen-free flame retardant. Organic flame retardants are hereby particularly preferred. In particular, flame retardants are used which are selected from the group consisting of conversion products of melamine with cyanuric acid, condensation products of melamine, in particular melem, melam, melon, conversion products of melamine with polyphosphoric acid, conversion products of condensation products of melamine with polyphosphoric acid, metal phosphinates phosphoric acid esters and/or mixtures hereof.

In particular, the flame retardant is selected from the group consisting of melamine cyanurate, melamine phosphate, melamine pyrophosphate, melamine polyphosphate, melem phosphate, melem pyrophosphate, dimelamine pyrophosphate, dimelamine phosphate, melon polyphosphate, phosphaphenanthrenes and mixtures hereof.

Preferably, the at least one metal phosphinate is selected from the group of phosphinic acid salts, diphosphinic acid salts and combinations hereof. Particularly preferably, it concerns a phosphinic acid salt of the general formula (I)

and/or formula (II)

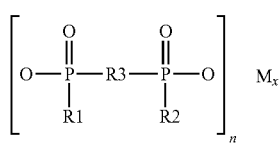

and/or the polymers thereof
wherein
R1, R2 are the same or different and are preferably C1-C8 alkyl, linear or branched and/or aryl;
R3 are C1-C10 alkylene, linear or branched, C6-C10 arylene, -alkylarylene or arylalkylene;
M is a metal ion from the $2^{nd}$ or $3^{rd}$ main or subsidiary group of the periodic table; and
m means 2 or 3;
n means 1 or 3;
x means 1 or 2.

As metal ion M, preferably Al, Ca and Zn is used.

The outer layer thereby comprises preferably from 5 to 30% by weight, preferably 10 to 25% by weight, particularly preferably 11 to 20% by weight, respectively relative to the weight of the moulding compound, of the at least one flame retardant.

It is preferred that the at least one impact modifier is a functionalised impact modifier selected from the group consisting of ethylene-propylene copolymers, ethylene-1-butene copolymers, ethylene-propylene-1-butene copolymers, styrene copolymers, styrene block copolymers and mixtures thereof.

The impact modifier can be functionalised by copolymerisation or by grafting. In the sense of the present invention, functionalisation by copolymerisation means the incorporation of the functionalising compound in the main chain of component (C) as component of this main chain. In contrast, there is understood by the functionalisation of component (C) by grafting, binding of the functionalising compound to the main chain so that side chains are produced.

Preferably, the at least one impact modifier is contained in a quantity of 0.1 to 30% by weight, preferably 5 to 25% by weight, particularly preferably 10 to 20% by weight in the inner layer.

It is further preferred that the outer layer comprises further additives selected from the group consisting of
(i) 0 to 15% by weight, preferably 2 to 12% by weight, particularly preferably 4 to 10% by weight, of at least one plasticiser,
(ii) 0.1 to 2% by weight, preferably 0.2 to 1.5% by weight, particularly preferably 0.3 to 1% by weight, of at least one stabiliser, in particular a thermostabiliser,
(iii) 0 to 5% by weight, preferably 0.1 to 4% by weight, particularly preferably 0.2 to 3.5% by weight, of at least one further additive selected from the group consisting of UV stabilisers, heat conductivity additives, flame-retardant synergists, processing aids, lubricants, colouring and marking materials, inorganic pigments, organic pigments, IR absorbers, intumescence means
and/or mixtures thereof, the sum of the additives (i) to (iii), relative to the weight of the moulding compound, being from 0.1 to 22% by weight.

The plasticiser of component (i) is preferably selected from the group consisting of amides of arylsulphonic acids with 2 to 12 C-atoms, esters of p-hydroxybenzoic acid with 2-20 C-atoms constructed in the alcohol component, phosphonates or phosphates, preferably the plasticiser consists of an arylsulphone amide.

Preferred phosphorus-containing plasticisers are inter alia diphenyl cresyl phosphate (Disflamol DPK), tris(2-ethylhexyl)phosphate, diphenyl-2-ethylhexylphosphate, tricresyl phosphate, alkyl- or arylphosphonates, diethylphosphonate or cyclic phosphonates, such as e.g. Aflammit PLF 710.

Preferred esters of 4-hydroxybenzoic acid are p-hydroxybenzoic acid octyl ester, p-hydroxybenzoic acid ethyl ester, p-hydroxybenzoic acid-i-hexadecyl ester, p-hydroxybenzoic acid-2-hexyldecyl ester.

It is preferred that the moulding compound forming the outer layer has a relative viscosity, measured according to ISO 307, of 1.6 to 1.9 and the moulding compound forming the inner layer has a relative viscosity, measured according to ISO 307, of 1.8 to 2.3.

The outer layer preferably has a thickness in the range of 0.1 to 1.5 mm, preferably of 0.12 to 1.4 mm, particularly preferably of 0.15 to 1.3 mm.

The thickness of the inner layer or structure is dependent upon the dependency of the type of moulded article, e.g. a pipe or a hose, and can be chosen correspondingly. Thicknesses in the range of 0.5 to 2.5 mm, particularly preferably of 0.75 to 1.6 mm, are preferred here.

Furthermore, it is preferred that the fluid transport pipe has no adhesive layer between the inner and outer layer and preferably consists of the inner and outer layer. This is achieved in particular by the same types of polyamide, e.g. PA12, being used for the inner and the outer layer. As a result, independent adhesion between inner and outer layer is achieved.

A liquid, preferably a coolant and particularly preferably a water-alcohol mixture, in particular a water-glycol mixture, is used preferably as fluid.

Preferably, the fluid transport pipe is present in the form of a smooth pipe or undulating pipe.

The fluid transport pipe is producible preferably from the moulding compounds for inner and outer layers by coextrusion, blow moulding and injection moulding.

The fluid transport pipe according to the invention is used for the supply of a fluid or a liquid, preferably a type of aqueous solution, particularly preferably of a coolant, in particular a water-alcohol mixture.

It is thereby preferred that the fluid transport pipe is used for the supply of a fluid in a motor or in a battery, in particular for electric vehicles.

The subject according to the invention is intended to be explained in more detail with reference to the subsequent examples without wishing to restrict said subject to the specific embodiments shown here.

The matrix materials used in the examples and the comparative examples and the properties thereof are listed in table 1.

TABLE 1

|  |  | PA (A) | PA (B) | PA (C) |
|---|---|---|---|---|
| PA 12 (i), ($\eta_{rel}$ = 1.65) Amine end group 45 mmol/kg | EMS-CHEMIE AG, Domat/Ems, Switzerland |  | 78.1 | 70.95 |
| PA 12 (ii), ($\eta_{rel}$ = 2.1) | EMS-CHEMIE AG, Domat/Ems, Switzerland | 70.95 |  |  |
| Irganox 245 | BASF SE | 0.50 | 0.5 | 0.50 |
| Hostanox PAR24 | Clariant GmbH |  | 0.2 |  |
| Tinuvin 234 | BASF SE | 0.50 |  | 0.50 |

TABLE 1-continued

|  |  | PA (A) | PA (B) | PA (C) |
|---|---|---|---|---|
| Disflamol DPK | Lanxess AG | 4.00 |  | 4.00 |
| Tafmer MC201 | Mitsui Chemicals Inc., Tokyo |  | 20.0 |  |
| FR masterbatch 1:1 PA12: melamine cyanurate | EMS-CHEMIE AG, Domat/Ems, Switzerland | 24.00 |  | 24.00 |
| Mg stearate | Peter Greven, DE | 0.05 |  | 0.05 |
| Colourant masterbatch | EMS-CHEMIE AG, Domat/Ems, Switzerland |  | 1.2 |  |

The following measuring methods were used within the scope of the present invention; if nothing different is noted, the test pieces were tested in the dry state.

Relative Viscosity

Relative viscosity was determined according to ISO 307 with 0.5 g polymer in 100 ml of a suitable solvent (e.g. m-cresol for polyamide 12) at a temperature of 20° C.

Extrusion Method

Pipes were coextruded on a Nokia Maillefer COEX5 pipe extruder at mass temperatures of 240-250° C. under a vacuum of 165 mbar and at an extrusion speed of 9.5 m/min. Pipes with an outer diameter of 15 mm, inner diameter of 12 mm and wall thickness of 1.5 mm were used as test pieces.

Flame Resistance Test:

Burning properties of the extruded pipes were measured according to a modification of the UL-94 measuring method. Test pieces were stored at 50% relative humidity at 23° C. for 48 hours or 70° C. for 7 days. For each construction, at least three tests were implemented. The extruded pipes (outer diameter 15 mm; wall thickness 1.5 mm) were shortened to 150 mm sections. The pipes were subsequently clamped vertically and the vertical burning test was implemented.

Pendulum Impact

Measured according to DIN 73378 at 23±2° C.

Determination of the NH$_2$ End Groups by Means of Potentiometric Titration

For determining the NH$_2$ end groups of the polyamide, a 0.5 g sample is dissolved in 50 ml m-cresol with agitation at 100° C. After addition of 25 ml isopropanol and 3 ml additional solution (6 g/l aminocaproic acid in glacial acetic acid), the potentiometric titration is effected with 0.05 M ethanolic perchloric acid solution.

Calculation of the NH$_2$ end groups is effected according to the formula:

$$NH_2 \text{ (mmol/kg)}:(a-b)*c*F*1000/E$$

with
- a consumption in ml of 0.05 mol/l ethanolic perchloric acid for the sample with additional solution
- b consumption in ml on 0.05 mol/l ethanolic perchloric acid for the additional solution
- c concentration of the ethanolic perchloric acid (0.05 mol/l)
- F factor of the 0.05 mol/l ethanolic perchloric acid
- E polymer weight in g In table 2, the mechanical properties and fire-retardant properties of the test pieces according to the invention and of the comparative test pieces are compared.

TABLE 2

|  |  | E1 | E2 | E3 | CE1 | CE2 | CE3 |
|---|---|---|---|---|---|---|---|
| Outer layer (A) |  | PA (A) | PA (A) | PA (A) | PA (B) | PA (A) | PA (C) |
| Inner layer (I) |  | PA (B) | PA (B) | PA (B) | PA (B) | PA (A) | PA (C) |
| Outer layer thickness | mm | 0.15 | 0.3 | 0.5 | 0.15 | 0.3 | 0.5 |
| Inner layer thickness | mm | 1.35 | 1.2 | 1.0 | 1.35 | 1.2 | 1.0 |
| UL 94 |  | V0 | V0 | V0 | n.c. | V0 | V0 |
| Pendulum impact | % | 0 | 0 | 0 | 0 | 20 | 40 |
| Breaking elongation (100 mm/min) | % | 270 | 265 | 250 | 290 | 180 | 160 | n.c.: not classifiable according to UL-94

Discussion of the Results

The examples according to the invention show a particularly good combination of mechanical and flame-retardant properties. Only with an inner layer made of hydrolysis-resistant thermoplastic is maintenance of the mechanics in the application ensured. The mechanical properties are however impaired significantly negatively if a flame retardant is added to the hydrolysis-resistant moulding compound. Good mechanics can in fact be achieved with comparative example 1, however at the cost of the flame properties. The addition of a flame retardant, as shown in comparative example 3, achieves the best classification according to UL-94 of V0, however again at the cost of the mechanics.

Only the test pieces according to the invention show in contrast good mechanical properties, at the same time the best classification according to UL-94 of V0 being achieved.

The invention claimed is:

1. A fluid transport pipe, comprising
    an inner layer, coming in contact with a fluid, formed from a moulding compound comprising at least one aliphatic polyamide and at least one impact modifier, the at least one polyamide having an amine end group concentration of 30 to 90 mmol/kg, and selected from the group consisting of PA12, PA11, copolyamides, mixtures, and blends thereof and
    at least one outer layer, connected directly to the inner layer, formed from a moulding compound comprising at least one aliphatic polyamide selected from the group consisting of PA12, PA11, copolyamides, mixtures, and blends thereof, having at least one flame-retardant.

2. The fluid transport pipe according to claim 1, wherein the inner and outer layers comprise polyamides of the same type.

3. The fluid transport pipe according to claim 1, wherein the polyamides have an amino end group concentration of 30 to 80 mmol/kg.

4. The fluid transport pipe according to claim 1, wherein the at least one flame retardant is a halogen-free flame retardant, selected from the group consisting of
    conversion products of melamine with cyanuric acid,
    condensation products of melamine,
    conversion products of melamine with polyphosphoric acid,
    conversion products of condensation products of melamine with polyphosphoric acid,
    metal phosphinates,
    phosphoric acid esters,
    and mixtures thereof.

5. The fluid transport pipe according to claim 1, wherein the outer layer comprises from 5 to 30% by weight, relative to the weight of the moulding compound, of the at least one flame retardant.

6. The fluid transport pipe according to claim 1, wherein the at least one impact modifier is a functionalised impact modifier selected from the group consisting of ethylene-propylene copolymers, ethylene-1-butene copolymers, ethylene-propylene-1-butene copolymers, styrene copolymers, styrene block copolymers, and mixtures thereof.

7. The fluid transport pipe according to claim 1, wherein the at least one impact modifier is contained in a quantity of 0.1 to 30% by weight in the inner layer.

8. The fluid transport pipe according to claim 1, wherein the outer layer comprises further additives selected from the group consisting of
 (i) 0 to 15% by weight of at least one plasticiser,
 (ii) 0.1 to 2% by weight of at least one stabiliser, and
 (iii) 0 to 5% by weight of at least one further additive selected from the group consisting of UV stabilisers, heat conductivity additives, flame-retardant synergists, processing aids, lubricants, colouring and marking materials, inorganic pigments, organic pigments, IR absorbers, intumescence means, and mixtures thereof, wherein the sum of the additives (i) to (iii), relative to the weight of the moulding compound, is from 0.1 to 22% by weight.

9. The fluid transport pipe according to claim 1, wherein the moulding compound forming the outer layer has a relative viscosity, measured according to ISO 307, of 1.6 to 1.9.

10. The fluid transport pipe according to claim 1, wherein the moulding compound forming the inner layer has a relative viscosity, measured according to ISO 307, of 1.8 to 2.3.

11. The fluid transport pipe according to claim 1, wherein the outer layer has a thickness in the range of 0.1 to 1.5 mm.

12. The fluid transport pipe according to claim 1, wherein the fluid transport pipe has no adhesive layer between the inner and outer layer.

13. The fluid transport pipe according to claim 1, wherein the fluid is a liquid.

14. The fluid transport pipe according to claim 1, wherein the fluid transport pipe is a smooth pipe or undulating pipe.

15. The fluid transport pipe according to claim 1, wherein the fluid transport pipe is produced from the moulding compounds for inner and outer layers by coextrusion, blow moulding, or injection moulding.

16. A method of supplying a liquid comprising utilizing the fluid transport pipe according to claim 1.

17. A method of supplying a fluid in a motor or in a battery comprising utilizing the fluid transport pipe according to claim 1.

* * * * *